Figure 1:
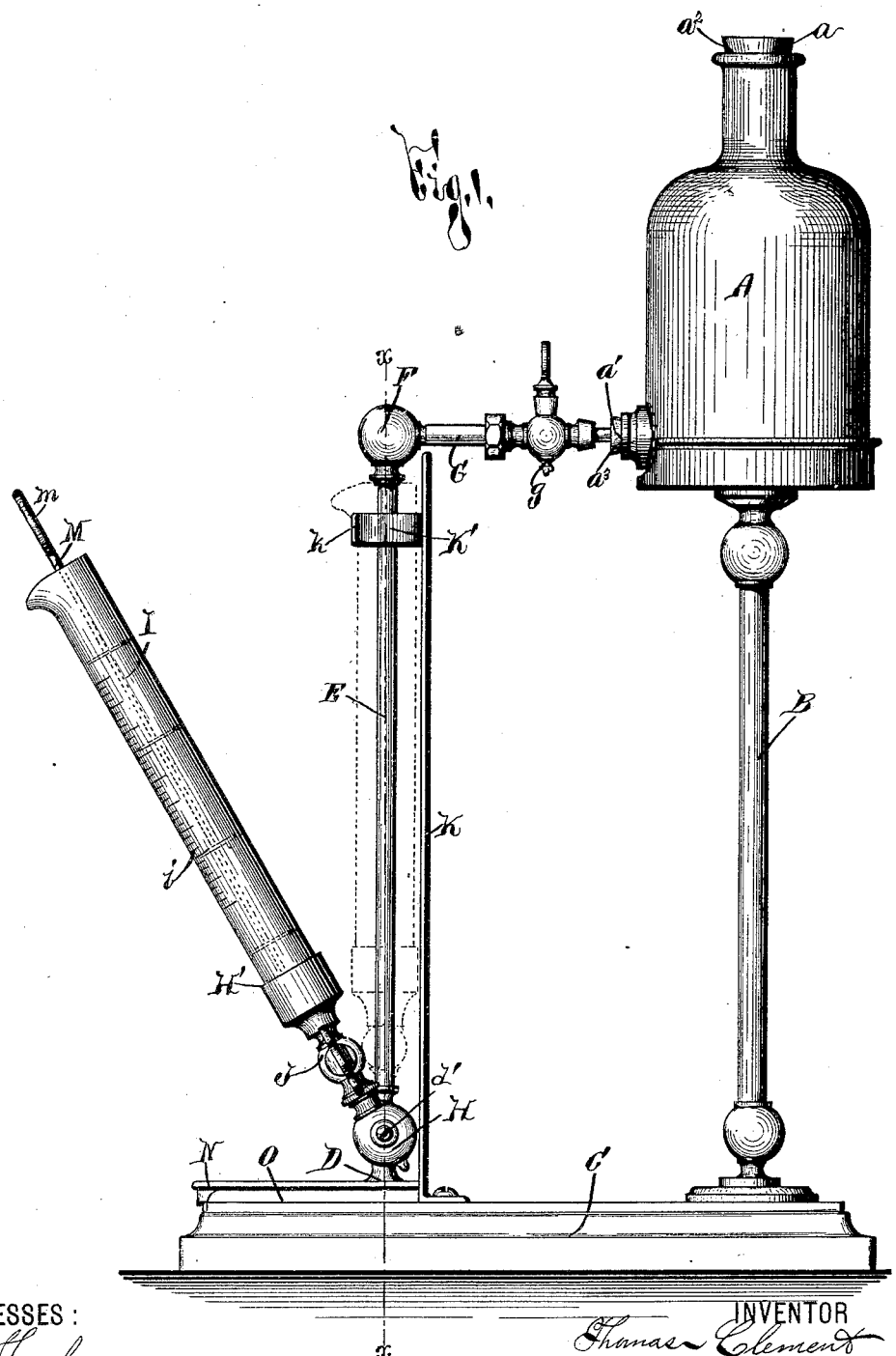

(No Model.) 2 Sheets—Sheet 1.

T. CLEMENT.
APPARATUS FOR TESTING LIQUIDS.

No. 424,643. Patented Apr. 1, 1890.

WITNESSES:

INVENTOR
Thomas Clement
BY
George W. Hey
ATTORNEY

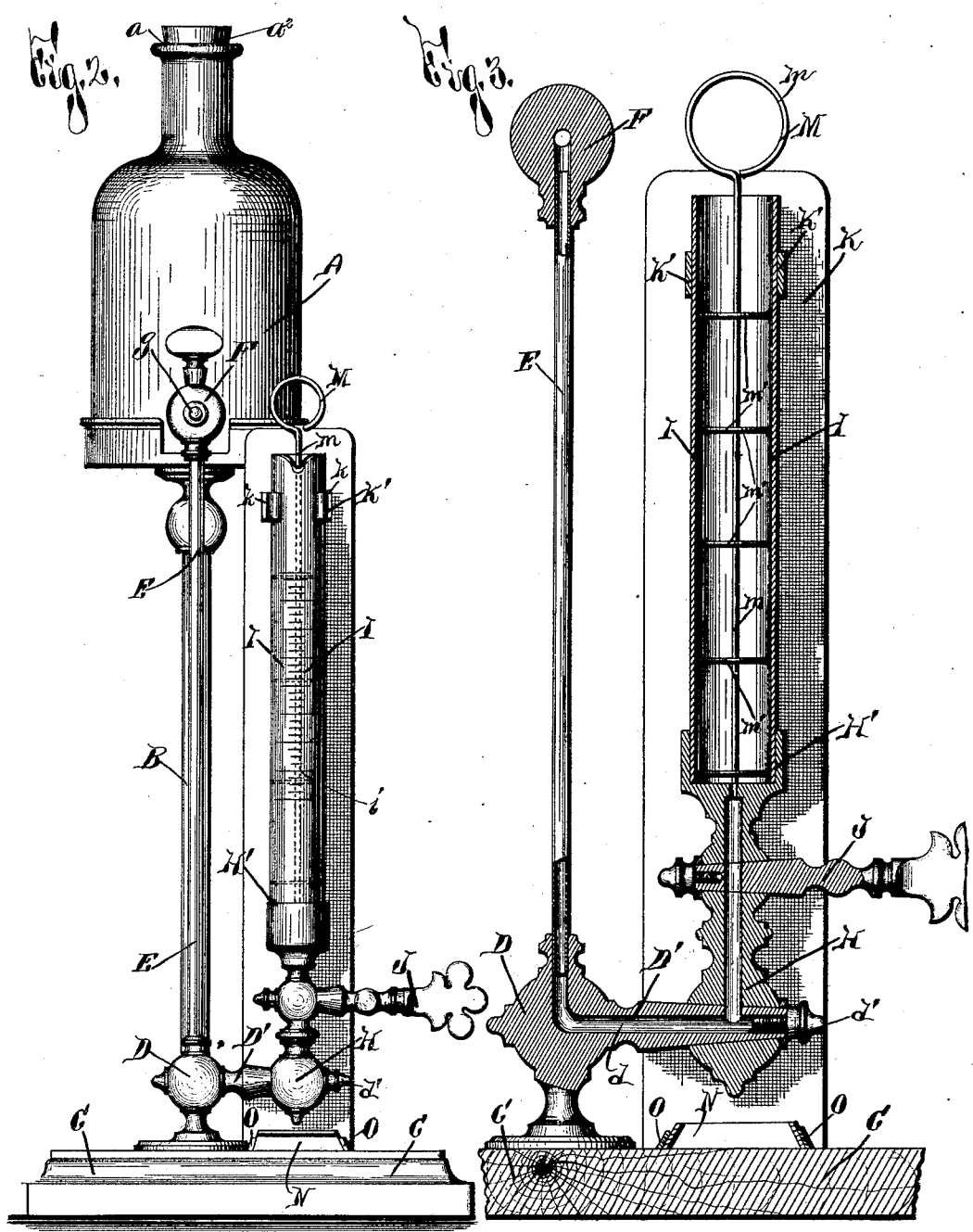

UNITED STATES PATENT OFFICE.

THOMAS CLEMENT, OF GLASGOW, COUNTY OF LANARK, SCOTLAND.

APPARATUS FOR TESTING LIQUIDS.

SPECIFICATION forming part of Letters Patent No. 424,643, dated April 1, 1890.

Application filed August 26, 1889. Serial No. 321,917. (No model.)

*To all whom it may concern:*

Be it known that I, THOMAS CLEMENT, of Glasgow, in the county of Lanark, Scotland, have invented a new and useful Apparatus for Testing Liquids, of which the following, taken in connection with the accompanying drawings, is a full, clear, and exact description.

My invention relates to an improved apparatus for testing the acidity of milk, curd, oils, and other articles, and preferably by means of my improved process, as set forth in my application for patent of even date herewith, and has for its object the production of a simple and effective device which is readily handled and operated and determines positively the amount of acid contained in the said articles; and to this end it consists, essentially, in a testing tube or receptacle, into which the milk or other article to be tested is placed, an alkali-containing reservoir, connections between said alkali-containing reservoir and the testing-tube, and graduations on said testing tube or receptacle for indicating the height to which the said material is raised upon the entrance or mixing therewith of the alkali.

It further consists in an agitator for stirring or mixing the material during its testing, and also in pivotally mounting said testing-tube, whereby the same may be readily emptied after the operation of my improved apparatus.

My invention furthermore consists in the detail construction and arrangement of the parts, all as hereinafter more particularly described, and pointed out in the claims.

In describing the invention reference is had to the accompanying drawings, forming a part of this specification, in which like letters indicate corresponding parts in all the views.

Figure 1 is an elevation of my improved apparatus, the testing tube or receptacle thereof being shown as slightly tilted to allow of the discharge of the material therefrom. Fig. 2 represents an elevation of the apparatus shown in Fig. 1 and taken in a plane at right angles to the plane of said Fig. 1; and Fig. 3 represents a longitudinal sectional view taken on line $x$ $x$, Fig. 1, with the testing tube or receptacle in its normal position.

A represents a suitable receptacle, supported upon any desirable form of standard B, which is preferably mounted upon a suitable plate or table C.

The reservoir A is either entirely or partially filled with a desirable alkali, and the inlet $a$ and the outlet $a'$ thereof are preferably filled with stoppers $a^2$ and $a^3$, of rubber or other suitable material, to prevent the escape of said alkali. Screwing or otherwise fitting into a suitable standard D, mounted upon the table or plate C, is a pipe E, connected by a joint F to a pipe G, which latter pipe is connected to the reservoir A. A suitable valve $g$ allows the entrance into the pipe E of the alkali from the receptacle A. Projecting from the standard D is the nipple D′, having a passage $d$, connected with the passage of the pipe E. Pivoted upon said hollow nipple D′ is the hollow standard H, preferably formed with a socket H′ at the upper end thereof. Mounted in this socket by any suitable air-tight joint is the testing tube or receptacle I, preferably consisting of glass or other transparent material and provided with suitable graduations $i$. By reference to the drawings it will be seen that this tube is preferably open at the bottom, allowing the entrance of the alkali, the flow of which is controlled by a suitable valve J in the standard H.

Arranged at the rear of the testing-tube I and standard H, I provide the backing K, mounted upon the plate C, and formed or provided at its upper extremity with a catch or other means K′ for engaging the upper extremity of said testing-tube I. This catch K′ is preferably formed by securing to the backing K a piece of spring metal, the central portion of which is of substantially the same contour as the adjacent surface of the testing-tube I. The opposite extremities $k$ of this spring metal are bent outwardly, as best illustrated in Fig. 2. When the testing-tube is forced to its upright position, the said extremities *k* are forced apart and spring around the said tube, retaining the same in its desired position.

Mounted in the tube I is a suitable agitator M, which is used to stir or mix the material filled into said tube. The preferable form of agitator consists of a rod *m*, having its upper extremity formed with a loop or other suitable means for readily grasping the same. Mounted on said rod are suitable perforated disks *m'*, arranged at intervals thereon.

Beneath the receptacle I is a tray N, guided in suitable ways O, which allow said tray to be readily withdrawn with whatever drippings have accumulated therein.

The operation of my improved apparatus is as follows: The milk, curd, or whey is first filled into the receptacle I, and then afterward a suitable indicator is mixed therewith until the height of the milk and indicator reaches the commencement of the graduations *i*. The valves J and *g* are then opened to allow the passage into the base of said receptacle of the alkali contained in the reservoir A, and meanwhile the agitator M is operated to stir or mix the said material and alkali. Upon the entrance of said alkali the height of the material gradually rises, and the lactic acid of the milk, curd, or whey becomes neutralized by the incoming alkali. As soon as the said acid is completely neutralized the alkali attacks the indicator, and immediately the material is given a slight pinkish tinge. The operator then shuts off the flow of the alkali, and by noting the height to which the material has risen he determines the amount of acid therein.

This apparatus is especially useful in the manufacture of cheese, and enables the operator to quickly, easily, and positively determine the amount of acid in the milk, curd, or whey at any stage in the manufacture thereof. The preferable form of alkali used in this process is a normal solution of caustic soda, and the preferable form of indicator is the material termed "phenolpthaline," which is a residue from saccharine or coal-tar. It will be understood, however, that my apparatus is not limited to the particular form of alkali, since others may be used, and, if desired, any other substance might be used instead of phenolpthaline which would have less affinity for the alkali than the lactic acid of the milk, and which after the neutralization of said acid would produce a noticeable result when attacked by the surplus of milk.

This apparatus may also be used for testing other materials besides milk, curd, or whey, and by placing an acid in the reservoir A said apparatus may be used to test the amount of alkali contained in any desired material. It may also be used to test the amount of either acid or alkali in any desired salt by placing either an alkali or an acid in said reservoir and using a suitable indicator.

My apparatus is very simple in construction, is readily manufactured, and, as will be observed, is readily taken apart for the purpose of cleansing. The hinged testing tube or receptacle is also a feature of advantage, since it allows of the ready emptying of the tested material.

It will be understood that I do not limit my invention to the precise form and construction of the parts thereof, since considerable change may be made therein without departing from the spirit of my invention.

Having thus fully described my invention, what I claim as new, and desire to secure by Letters Patent, is—

1. In combination, a testing tube or receptacle for the material to be tested, an inlet in said testing-tube, a reservoir A, a connecting-passage between said reservoir and receptacle, and an agitator or mixer for mixing said material, substantially as described.

2. In combination, a testing tube or receptacle for the material to be tested in said tube, a reservoir A, a connecting-passage between said receptacle and reservoir A, and an agitator mounted in said receptacle and movable up and down therein, substantially as set forth.

3. In combination, a testing tube or receptacle for the material to be tested, an inlet in said testing tube or receptacle, a reservoir A, and a connecting-passage between said testing tube or receptacle and the reservoir A, an agitator-frame, and perforated disks mounted thereon, substantially as and for the purpose specified.

4. The combination of a testing tube or receptacle having an inlet in the upper end and hinged to a supporting-base, a reservoir A, and piping between said hinged receptacle and reservoir and opening into the lower part of said testing tube or receptacle, and graduations *i*, provided upon said receptacle, substantially as specified.

5. The combination, with a support, of a hinged testing tube or receptacle and a clamp for retaining said tube or receptacle in its normal position, substantially as set forth.

6. In an apparatus for testing the acidity of materials, the combination of a support, a hinged receptacle, a spring-clamp mounted on said support and adapted to automatically engage said receptacle, a second receptacle, and a connection between said receptacles, substantially as and for the purpose specified.

7. The combination, with a support, of a hinged testing tube or receptacle and a spring-clamp for automatically engaging said tube or receptacle and retaining the same in its desired position, substantially as described.

8. In combination, a reservoir A, a hinged testing tube or receptacle, a connection between said reservoir and testing-tube, a support beneath said testing-tube, and a tray or receptacle removably supported by said support, substantially as and for the purpose set forth.

9. In combination, a reservoir A, a hinged testing tube or receptacle, a connecting-passage between said testing-tube and reservoir, and a tray beneath said hinged testing tube or receptacle, substantially as specified.

In testimony whereof I have hereunto signed my name, in the presence of two attesting witnesses, at Syracuse, in the county of Onondaga, in the State of New York, this 6th day of June, 1889.

THOMAS CLEMENT.

Witnesses:
CLARK H. NORTON,
A. E. PARSONS.